United States Patent
Slezak

(10) Patent No.: US 10,186,714 B2
(45) Date of Patent: Jan. 22, 2019

(54) METHOD FOR INCREASING RECYCLED MANGANESE CONTENT

(71) Applicant: Energizer Brands, LLC, St. Louis, MO (US)

(72) Inventor: Philip J. Slezak, North Ridgeville, OH (US)

(73) Assignee: Energizer Brands, LLC, St. Louis, MO (US)

(*) Notice: Subject to any disclaimer, the term of this patent is extended or adjusted under 35 U.S.C. 154(b) by 0 days.

(21) Appl. No.: 15/629,177

(22) Filed: Jun. 21, 2017

(65) Prior Publication Data

US 2018/0375110 A1  Dec. 27, 2018

(51) Int. Cl.
| | |
|---|---|
| H01M 6/00 | (2006.01) |
| H01M 6/52 | (2006.01) |
| C01G 45/02 | (2006.01) |
| H01M 4/42 | (2006.01) |
| H01M 4/50 | (2010.01) |

(52) U.S. Cl.
CPC .............. *H01M 6/52* (2013.01); *C01G 45/02* (2013.01); *H01M 4/42* (2013.01); *H01M 4/50* (2013.01)

(58) Field of Classification Search
CPC .................................. H01M 6/52; C01G 45/02
USPC ....... 423/202, 208, 49, 50, 605, 109; 429/49
See application file for complete search history.

(56) References Cited

U.S. PATENT DOCUMENTS

| | | |
|---|---|---|
| 4,401,463 A | 8/1983 | Melin et al. |
| 5,352,270 A | 10/1994 | Schackle |
| 8,586,218 B1 | 11/2013 | Smith et al. |
| 8,728,419 B1 | 5/2014 | Smith et al. |
| 8,911,696 B1 | 12/2014 | Smith et al. |
| 9,620,790 B2 | 4/2017 | Deighton |

FOREIGN PATENT DOCUMENTS

WO    2010/086407    *   5/2010

OTHER PUBLICATIONS

Buzatu et al, "Study concerning the recovery . . . " Waste Mgt. 33, pp. 699-705. (Year: 2013).*
Sobianowska-Turek et al, "Recovery of zinc and manganese . . . " J. of Power Sources 325, pp. 220-228. (Year: 2016).*
Chen, W., et al. "Recovery Zinc and Manganese from Spent Battery Powder by Hydrometallurgical Route," Energy Procedia, 2017, pp. 167-174, vol. 107.
Das, A.P., et al. "Reductive Acid Leaching of Low Grade Manganese Ores," Geomaterials, Oct. 2012, pp. 70-72, vol. 2.
Ferella, F., et al. "Extraction of Zinc and Manganese from Alkaline and Zinc-Carbon Spent Batteries by Citric-Sulphuric Acid Solution," Intl. J. Chem. Engineering, 2010, pp. 1-13, vol. 61.
Sayilgan, E., et al. "A review of technologies for the recovery of metals from spent alkaline and zinc-carbon batteries," Hydrometallurgy, 2009, pp. 158-166, vol. 97.

* cited by examiner

*Primary Examiner* — Steven J Bos
(74) *Attorney, Agent, or Firm* — Alston & Bird LLP

(57) ABSTRACT

Methods of recycling batteries are provided, in which reaction conditions and elements are designed to maximize manganese recovery while minimizing zinc and potassium impurities in the recovered manganese. Methods of treating waste solution created by washing the manganese, so as to remove zinc from the waste solution, are also provided. Batteries prepared via such methods are also provided.

8 Claims, 13 Drawing Sheets

METHOD FOR INCREASING RECYCLED MANGANESE CONTENT

BACKGROUND

Nearly 3 billion dry-cell batteries are purchased every year in the United States. In order to reduce the number of these that end up in landfills, efforts have been made to push both the use of rechargeable batteries and the recycling of disposable batteries. Recovery of battery materials via recycling can also provide cost benefits in battery production compared to producing batteries using all new material (Sayilgan 2009). As the demand for batteries containing recycled materials increases, the need for more efficient recycling processes also increases.

Processes for recycling batteries are described in U.S. Pat. Nos. 8,728,419 and 8,911,696, both to Smith et al., as well as Ferella et al. (2010), which are hereby incorporated by reference in their entirety. A variety of other chemical and/or mechanical methods for recovering metals, and particularly manganese (Mn) from discharged batteries, are known in the art. Among the types of batteries that comprise recoverable manganese are alkaline batteries, in the cathode, and zinc carbon batteries, in the interior of the battery, adjacent to the anode. The recovered manganese can be used to make electrolytic manganese dioxide (EMD). The recovered manganese may have impurities, including potassium (K) and zinc (Zn), which reduces the utility of the recycling process. For example, recycled cathode manganese recovered from alkaline batteries inherently has high levels of potassium due to the potassium hydroxide (KOH) electrolyte in the cell and high levels of zinc from cross-contamination of the anode. While many methods focus on the separation of the zinc, very little effort is focused on removal of potassium. Current mechanical and thermal recycling processes are ineffective at removing potassium. Potassium negatively impacts the regenerated EMD performance, quality, and costs. This reduces the efficiency of using the recovered manganese to produce EMD for use in batteries comprising recycled content. In turn, this makes it difficult to produce batteries comprising a higher percentage of recycled manganese ("higher recycled content" or "higher content").

Consequently, a need for a more efficient process for obtaining and purifying recycled material from discarded alkaline or zinc carbon battery feedstock exists. In particular, a system that reduces the amount of potassium and zinc impurities, and/or increases the amount of recovered manganese, would be welcomed. A method of reusing water used during the recovery process, so as to produce less waste water in the course of recycling, would also be welcomed.

BRIEF SUMMARY

An embodiment is a process for removing potassium from an aqueous solution, comprising the step of:
a) reacting potassium sulfate with ferric sulfate so as to form potassium jarosite,
wherein the iron:potassium ratio is no greater than about 20:1.

An embodiment is a process for reducing the amount of fresh water required to recycle a plurality of batches of recovered battery material, comprising the steps of:
a) contacting manganese oxide solids comprising zinc and impurities with an acidic solution, so as to produce a waste solution comprising impurities;
b) raising the pH of the waste solution to at least 9.0 so as to cause a portion of the impurities to precipitate;
c) removing precipitated impurities; and
d) after removing the precipitated impurities, using the waste solution to wash additional recovered battery material;
wherein the impurities comprise zinc or potassium impurities.

An embodiment is a process for recycling batteries, comprising the steps of:
a) separating active materials contained within battery cases from the battery cases, wherein the active materials comprise fine electrode powders of manganese oxides;
b) extracting residual zinc and potassium compounds from the fine electrode powders to obtain a purified manganese oxide product;
wherein step b) is performed using waste solution which has previously been used in the course of recycling batteries; and wherein the waste solution has been treated to remove zinc by the addition of NaOH.

An embodiment is a battery produced using any of the above embodiments.

DETAILED DESCRIPTION AND DISCUSSION

Figure 1:
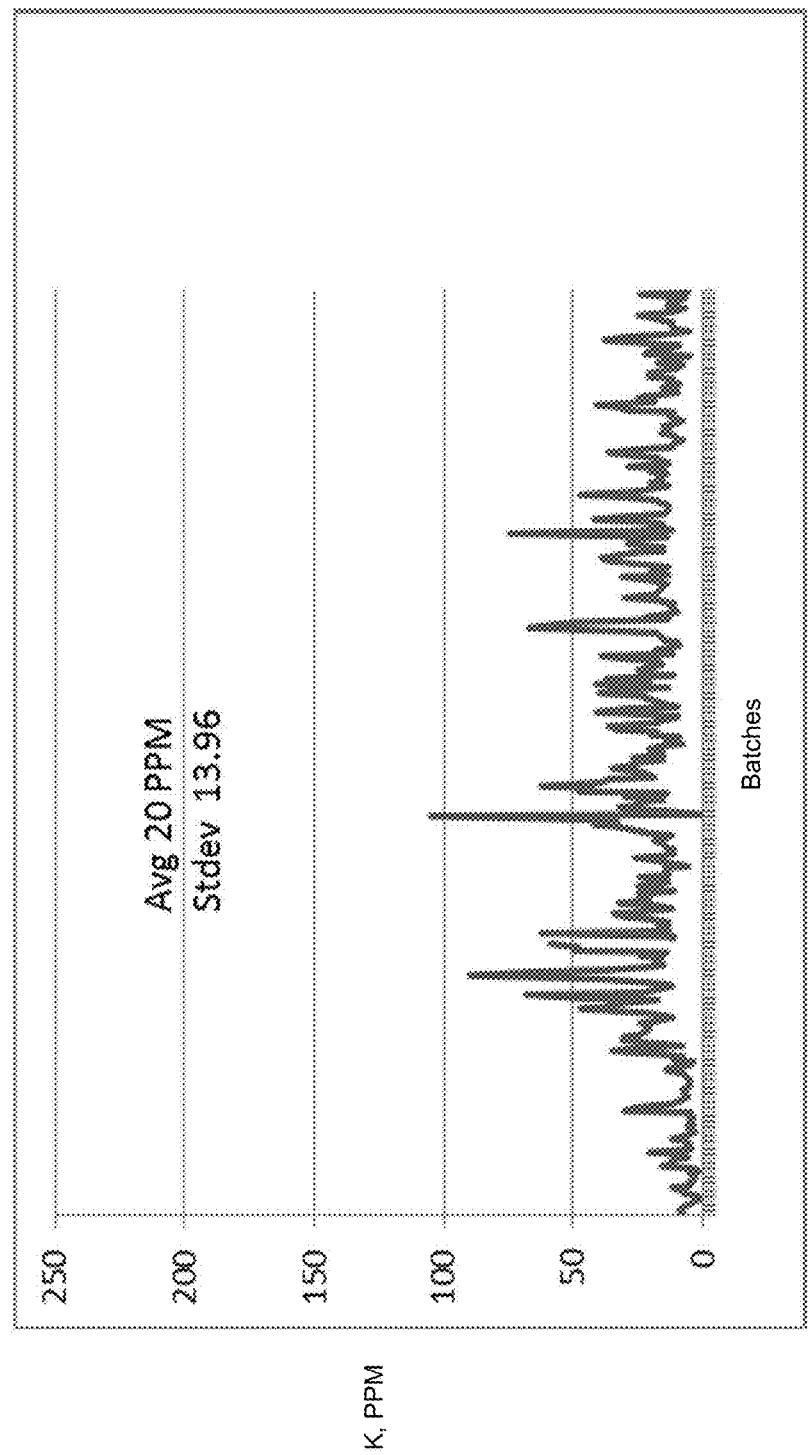
FIG. 1 shows the potassium impurity levels in 4% recycled cell feed.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item. For example, "an organic additive" may refer to two or more organic additives. The word "or" is intended to be inclusive rather than exclusive, unless context suggests otherwise. As an example, the phrase "A employs B or C," includes any inclusive permutation (e.g., A employs B; A employs C; or A employs both B and C).

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 7-10%, 5.1%-9.9%, and 6.01%-8.99%. As another example, "≥90" includes ≥91, ≥92, ≥93 . . . ; ≥90.1, ≥90.2, ≥90.3 . . . ; and ≥90.01, ≥90.02, ≥90.03 . . . .

As used herein, "about" in the context of a numerical value or range means within ±10% of the numerical value or range recited or claimed.

As used herein, "regular ore," "virgin ore" or "non-recycled ore" refers to ore that has not been recovered from batteries.

As used herein, "waste solution" refers to a solution that has already been used in at least one aspect of the battery recycling process in order to obtain recycled manganese. The waste solution may have impurities within, such as zinc and/or potassium. The waste solution may be treated waste solution, meaning that it has been altered so as to make it suitable for either re-use or environmentally safe disposal.

As used herein, "substantially" means refers to the complete or nearly complete extent or degree of an action, characteristic, property, state, structure, item, or result. For example, "Substantially all" may mean ≥90%, ≥95%, ≥99%, ≥99.9%, or ≥99.99%.

An embodiment is a process for removing potassium from an aqueous solution, comprising the step of:
  a) reacting potassium sulfate with ferric sulfate so as to form potassium jarosite,
   wherein the iron:potassium ratio is no greater than about 20:1.

In an embodiment, the iron:potassium ratio is no greater than about 15:1, or is about 11.5:1.

In an embodiment, the reaction occurs at a pH of about 1.8 to about 2.0.

In an embodiment, the aqueous solution is a sulfuric acid solution.

An embodiment is a process for reducing the amount of fresh water required to recycle a plurality of batches of recovered battery material, comprising the steps of:
  a) contacting manganese oxide solids comprising zinc and impurities with an acidic solution, so as to produce a waste solution comprising impurities;
  b) raising the pH of the waste solution to at least 9.0 so as to cause a portion of the impurities to precipitate;
  c) removing precipitated impurities; and
  d) after removing the precipitated impurities, using the waste solution to wash additional recovered battery material;
wherein the impurities comprise zinc or potassium impurities.

In an embodiment, in step b) the pH is raised to at least 10.0. In an embodiment, in step b) the pH is raised by adding NaOH.

In an embodiment, the pH of the waste solution is reduced prior to step d).

In an embodiment, the acidic solution is a sulfuric acid solution.

An embodiment is a process for recycling batteries, comprising the steps of:
  a) separating active materials contained within battery cases from the battery cases, wherein the active materials comprise fine electrode powders of manganese oxides;
  b) extracting residual zinc and potassium compounds from the fine electrode powders to obtain a purified manganese oxide product;
wherein step b) is performed using waste solution previously generated in the course of recycling batteries; and wherein the waste solution has been treated to remove zinc by the addition of NaOH.

In an embodiment, step b) is performed in an aqueous solution or aqueous slurry at a pH of less than or about 1.5. In an embodiment, the pH is about 0.8.

In an embodiment, step a) is carried out using a water spray to obtain a slurry of the fine electrode powders and pieces of the battery cases.

In an embodiment, the separation in step a) comprises sieving the active materials and the battery cases through a screen to separate the active materials from the battery cases. In an embodiment, the screen is a 20+ mesh screen.

In an embodiment, during step a) the active materials are present in the form of an aqueous slurry having a pH of greater than 8.

In an embodiment, the purified manganese oxide product from step b) is roasted at 350-400° C. to remove substantially all volatile or corrosive impurities or traces of mercury prior to calcinating the purified manganese oxide product at 850° C. or higher.

In an embodiment, the liquid to solid ratio during step c) is between about 12:1 to about 14:1.

In an embodiment, the aqueous solution or aqueous slurry comprises sulfuric acid.

In an embodiment, a process as described above results in recovered manganese solids comprising <15,000 PPM Zn, <14,000 PPM Zn, <13,000 PPM Zn, <12,000 PPM Zn, <11,000 PPM Zn, <10,000 PPM Zn, <9,000 PPM Zn, <8,000 PPM Zn, <7,000 PPM Zn, <6,000 PPM Zn, or <5,000 PPM Zn. In an embodiment, a process as described above results in recovered manganese solids comprising <7,000 PPM K, <6,500 PPM K, <6,000 PPM K, <5,500 PPM K, <5,000 PPM K, <4,500 PPM K, <4,000 PPM K, <3,500 PPM K, or <3,000 PPM K. In an embodiment, a process as described above results in recovered manganese solids comprising >46% Mn, >47% Mn, >48% Mn, >49% Mn, >50% Mn, >51% Mn, >52% Mn, >53% Mn, or >54% Mn, by weight.

An embodiment is a battery produced using any of the above embodiments. In an embodiment, the battery is an alkaline battery. In another embodiment, the battery is a carbon zinc battery. In an embodiment, the battery comprises manganese, wherein greater than about 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.9% of the manganese, by weight percent, is recovered from recycled batteries. In an embodiment, about 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.9%, or 100% of the manganese, by weight percent, is recovered from recycled batteries.

One way of separating the cathode from the battery is via a mechanical process, for example, as described in U.S. Pat. No. 9,620,790, which is incorporated herein by reference in its entirety. In this process, for alkaline batteries, the battery is cut opened and the anode is removed. The cathode is then crushed and the can is removed via mechanical separation. For zinc carbon batteries, the exterior part of the battery would be removed, and the inside of the battery, containing manganese, would be kept for further processing. A second way of separating the cathode from the battery is via a hydrometallurgical process. Here, the batteries are crushed and shredded, the large can pieces and paper are removed, and the material is then hydrometallurgically cleaned to remove most of the zinc and potassium. Different types of batteries, such as alkaline batteries and zinc carbon batteries, may be shredded together.

As mentioned, recovered manganese has potassium and zinc impurities which reduce its quality. For higher recycled content EMD materials, these levels should be less than 15,000 PPM Zn and less than 7,000 PPM K. Typical non-recycled ore has approximately 5,000-8,000 PPM K, and <100 PPM Zn. Further, the manganese content of the recovered material should be at least 48%. Typical non-recycled (i.e. virgin) ore contains approximately 48-50% manganese.

In a first step of a hydrometallurgical process used to separate the cathode from the remainder of the battery, the batteries may be fed through a crusher or shredder to open up the batteries and thereby liberate the electrode powders contained within. In one embodiment, a hammer mill with water spray is employed, although alternatively this step may be run dry. The pH optionally may be greater than 8 following this step, as a neutral or higher pH may help protect the equipment from corrosion. To raise the pH greater than 8, an alkali hydroxide, such as sodium hydroxide (NaOH) or potassium hydroxide (KOH) may be added. However, it usually will not be necessary to add an alkali hydroxide for recycling alkaline batteries alone, because of the inherent alkalinity of alkaline batteries.

The crushed batteries, which are typically in the form of an aqueous slurry, may then be deposited onto a shaker table or surface providing size separation (screening action). The coarser material containing almost all of the steel from the battery cases, the brass pins, separator materials and coarser case materials remain on the shaker table or screening device. The shaker table or screening device may have ¼" openings, for example (although the shaker table may have openings of any of a variety of sizes). The finer electrode materials containing substantially all of the manganese oxides, carbon, zinc hydroxides, other zinc compounds, and any unreacted powdered zinc metal can be passed through a screen (e.g., a 20+ mesh screen) to produce a basic slurry (typically having a pH greater than 9). Optionally, this basic slurry may be passed through a magnetic separator to remove any small pieces of steel which may still be present. The slurry is next combined with sulfuric acid. The coarser material (for example, material captured by the 20+ mesh screen) which is separated from the initial crushed batteries may be dried and passed through a magnetic separator to recover clean steel particles, which can then be recycled (to steel mills, for example).

Alternatively, in a mechanical separation process, for alkaline batteries, a battery (or multiple batteries simultaneously) may have its ends cut off, such as by a saw, a water jet, and/or the like, and then have the anode basket pushed out, such as by a finger with air.

The remaining material, the can and the cathode material, is shredded, for example, by a shredder. The steel is removed from this shredded material via magnetic separation. The remaining material is the cathode (manganese) material. For zinc carbon batteries, the interior of the batteries would contain the manganese oxide solids, so the interior of the battery would be retained. To wash the manganese oxide solid material, it may then be slurried in water and combined with sulfuric acid. Alternatively, an aqueous sulfuric acid solution may be combined directly with the recovered solids.

In either case, the sulfuric acid serves to extract zinc and potassium remaining in the manganese oxide solids, thereby producing an acid-extracted manganese oxide product, in a washing step. The manganese oxide solids may contain manganese dioxide ($MnO_2$) and other discharged products, such as manganese (III) oxide ($Mn_2O_3$), manganese (II) hydroxide ($Mn(OH)_2$), manganese (II,III) oxide ($Mn_3O_4$), or zinc manganate ($ZnMn_2O_4$). The goal is to remove zinc and potassium while minimizing manganese dissolution. The ultimate goal is to dissolve the zinc and potassium while leaving the manganese as a solid. Typically, an amount of sulfuric acid is used which is sufficient to achieve a pH below 3 in the aqueous slurry of manganese oxide solids.

In a preferred embodiment, a pH less than or about 1.5 is achieved. In another preferred embodiment, a pH less than or about 0.8 is achieved. In an embodiment, the liquid to solid ratio is about 5:1 to 15:1. In a preferred embodiment, the liquid to solid ratio is about 5:1 to 7:1. In a more preferred embodiment, the liquid to solid ratio is about 5.6:1. In a preferred embodiment, the liquid to solid ratio is about 12:1 to 14:1. In a more preferred embodiment, the liquid to solid ratio is about 13:1. The mixture of manganese oxide solids, sulfuric acid and water may be agitated or mixed by stirring, for example. The manganese oxide solids may be contacted with the sulfuric acid for a time and at a temperature effective to achieve a desired reduction in the zinc and potassium content of the manganese oxide solids. For example, such contacting may be carried out for about 30 minutes to about 4 hours at a temperature of from about room temperature (or 25° C.) to about 70° C. In an embodiment, water used in this process is reused, treated water used in previous battery recycling.

For mechanically separated material, in a preferred embodiment, a liquid to solid ratio of approximately 13:1 is used, at a pH of 1.5, for about 30 minutes, at approximately room temperature.

For hydrometallurgically separated material, in a preferred embodiment, a liquid to solid ratio of about 5.6:1 is used, at a pH of about 0.8, for at least about 4 hours at about 70° C. In another embodiment, a liquid to solid ratio of about 13:1 is used, at a pH of about 1.4 to about 1.5, for between 30 minutes and 4 hours at about 70° C.

The further purified manganese oxide solids (acid-extracted manganese oxide product) may be separated from the sulfuric acid solution by any suitable method, such as filtration. If filtration is used, the resulting filter cake may be washed. The pH of the acidic extract obtained as a result of the treatment with sulfuric acid may be adjusted, through the addition of a base such as an alkali hydroxide, to a pH of about 9 to about 10 to precipitate the extracted zinc as well as the extracted manganese that may be present in the acidic extract. This washing step uses a significant amount of water, which can be treated as discussed below so as to reduce the amount of waste water produced.

The separated manganese oxide solids separated from the sulfuric acid solution may thereafter be furnaced under a low oxygen atmosphere at a temperature of 850° C. or greater to convert $MnO_2$ to manganese (II) oxide (MnO). For example, the low oxygen atmosphere may be an inert atmosphere, e.g., a nitrogen atmosphere. In one embodiment, the low oxygen atmosphere used contains less than 5% $O_2$ by volume. The furnacing temperature may be about 900° C., for example. Prior to furnacing under the low oxygen atmosphere, the acid-extracted manganese oxide product may be subjected to a distinct initial step wherein it is first roasted at 350-400° C. prior to heating to the furnacing temperature (850° C. or greater). This initial roasting step may be carried out under conditions effective to remove any volatile or corrosive impurities or traces of mercury. The product obtained by furnacing, a calcined ore, may be cooled under an inert atmosphere to protect it from re-oxidation. This product may be subsequently packaged and shipped to another location for subsequent stages in the recycling process.

The manganese oxide solids prior to furnacing may contain some graphite carbon derived from the batteries; this carbon aids in the conversion of $MnO_2$ to MnO.

As an alternative method of converting $MnO_2$ to MnO, the manganese may be reduced using iron pyrite ($FeS_2$). As another alternative method, the $MnO_2$ may be chemically converted to manganese (II) carbonate ($MnCO_3$). In this process, a solution having zinc and manganese is treated with ammonium carbonate in ammonia. The carbonate preferentially reacts with the manganese to form manganese (II) carbonate. The zinc remains in solution. Manganese (II) carbonate decomposes at elevated temperature (at least about 200° C.) to produce manganese (II) oxide, with a release of carbon dioxide. Alternatively, the manganese carbonate can be used directly to generate EMD, along with carbon dioxide, without first being decomposed to manganese (II) oxide.

The recovered, optionally washed MnO then undergoes a leaching process. The steps of this process may be seen in Table 1, below. The reactions are generally performed in the temperature range of 92-98° C. "G/L" means grams per liter.

TABLE 1

Leaching reactions (with Hydrogen shuttle)

| Reaction | Steps/Conditions |
|---|---|
| Reaction 1: Leaching of manganese | Calcined ore 30+ G/L 38+ G/L $MnO + H_2SO_4 \rightarrow MnSO_4 + H_2O$ |
| Reaction 2: Dissolution of ferrous oxide | Ferrous oxide (+2) pH <1.8 Ferrous sulfate (+2) $FeO + H_2SO_4 \rightarrow FeSO_4 + H_2O$ |
| Reaction 3: Conversion of ferrous to ferric | Ferrous sulfate C4 ore pH <1.8 Ferric sulfate $2FeSO_4 + MnO_2 + 2H_2SO_4 \rightarrow Fe_2(SO_4)_3 + MnSO_4 + 2H_2O$ |
| Reaction 4: Conversion of remaining ferrous to ferric and dissolve surface $MnO_2$ | Hydrogen peroxide pH 1.8 Ferric iron $2Fe^{+2} + H_2O_2 + 2H^+ \rightarrow 2Fe^{+3} + 2H_2O$ $2FeSO_4 + H_2O_2 + H_2SO_4 \rightarrow Fe_2(SO_4)_3 + 2H_2O$ $MnO_2 + H_2O_2 + 2H^+ \rightarrow Mn^{+2} + H_2O + O_2$ |
| Reaction 5: Jarosite reaction (potassium removal) | Ferric sulfate pH 1.8-2.0 Potassium jarosite $K_2SO_4 + 3Fe_2(SO_4)_3 + 12H_2O \rightarrow 2KFe_3(SO_4)_2(OH)_6 + 6H_2SO_4$ |
| Reaction 6: Leaching of manganese | Calcined ore pH 3 <<55 G/L $MnO + H_2SO_4 \rightarrow MnSO_4 + H_2O$ |
| Reaction 7: Conversion of remaining ferrous to ferric | Hydrogen peroxide pH 3 Ferric iron $2Fe^{+2} + H_2O_2 + 2H^+ \rightarrow 2Fe^{+3} + 2H_2O$ $2FeSO_4 + H_2O_2 + H_2SO_4 \rightarrow Fe_2(SO_4)_3 + 2H_2O$ $MnO_2 + H_2O_2 + 2H^+ \rightarrow Mn^{+2} + H_2O + O_2$ |
| Reaction 8: Precipitation of ferric | Ferric iron pH >3.6 Ferric hydroxide $2Fe^{+3} + 6H_2O \rightarrow 2Fe(OH)_3 + 6H^+$ |
| Reaction 9: Leaching of manganese | Calcined ore pH >4.1 55 G/L $MnO + H_2SO_4 \rightarrow MnSO_4 + H_2O$ |

Figure 12:
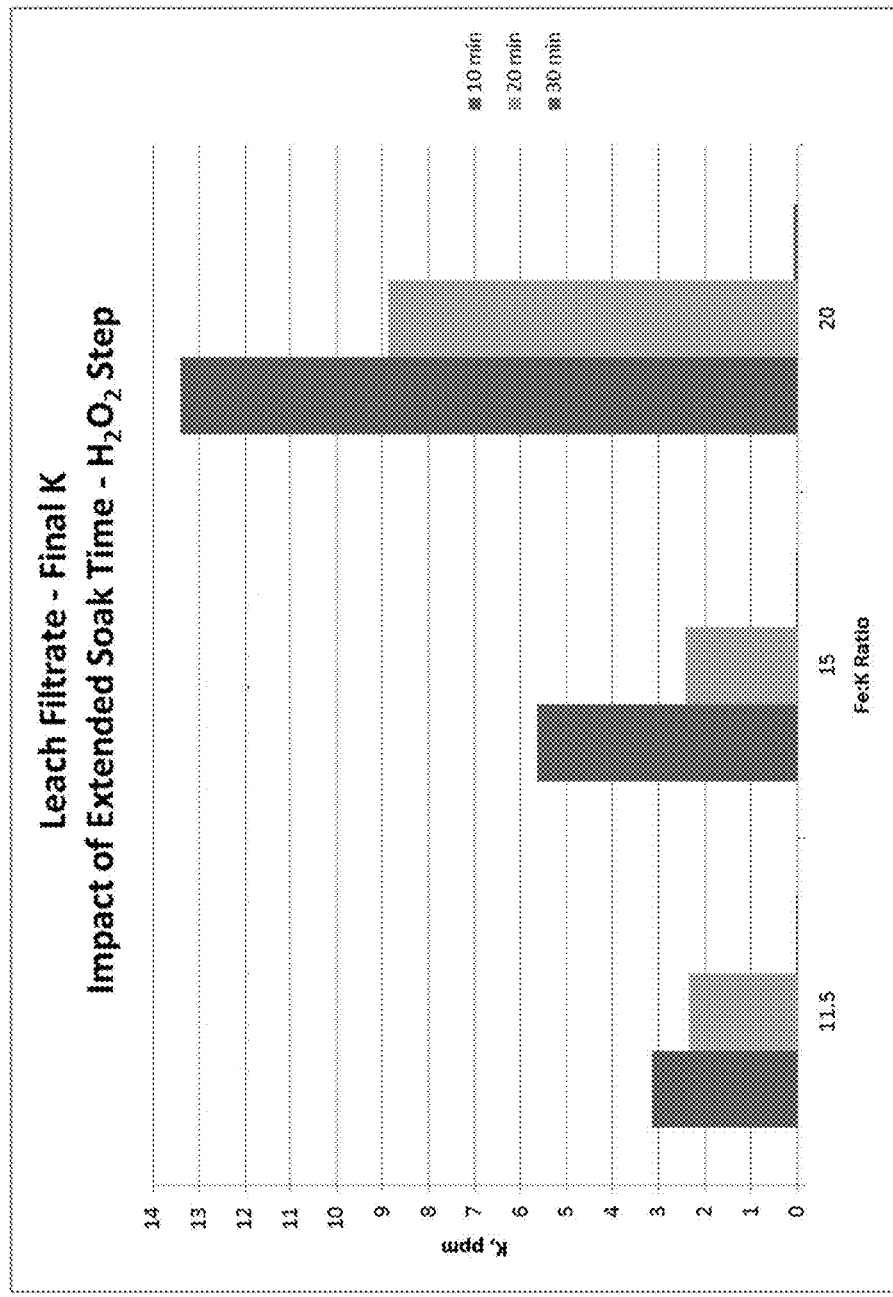
FIG. 12 shows the impact of additional peroxide reaction time on the final leach potassium impurity levels for 25% recycled material, for different Fe:K ratio. Within each Fe:K ratio, from left to right, the bars represent 10, 20 and 30 additional minutes of soak time, respectively, added to the standard time of 30 minutes.

Controlling the iron:potassium (Fe:K) ratio in Reaction 5 (the jarosite reaction) is important for maximizing potassium removal. In an embodiment, the Fe:K ratio is no greater than about or about 20:1. In a preferred embodiment, the Fe:K ratio is no greater than about or about 15:1. In a more preferred embodiment, the Fe:K ratio is no greater than about or about 11.5. A higher Fe:K ratio may be used, but low-potassium ore or a caustic solution (i.e., lime, NaOH . . . ) will need to be used to raise the final pH. Further, the hydrogen peroxide ($H_2O_2$) steps (Reactions 4 and 7) should take at least 15 and 30 minutes, respectively, but may each be extended in order to allow more potassium to be dissolved. When the Fe:K ratio is maintained at 11.5, added time for the hydrogen peroxide steps improves the removal of potassium, but added time may not be necessary, given that the standard times of 15 and 30 minutes usually results in sufficient removal of potassium. FIG. 12 shows the effects of additional soak time during Reaction 7 on final potassium levels. Further, when there is excess ferric iron in solution, Reaction 8 reduces the pH of the solution so as to cause the process to go back to Reaction 5.

Following the leaching process, sulfiding is then performed in order to remove heavy metals, including zinc, copper (Cu), cobalt (Co), nickel (Ni), molybdenum (Mo), and mercury (Hg). The reactions are shown below, in Table 2. The reactions are generally performed in the temperature range of 70-80° C.

TABLE 2

Sulfiding reactions for heavy metal removal pH 3.8-4.2    Hydrogen Sulfide Gas
$2NaSH + H_2SO_4 \rightarrow 2H_2S \uparrow + Na_2SO4$
Hydrogen Sulfide Insoluble Metal Sulfides
$H_2S + M^{++} \rightarrow MS \downarrow + 2H^+$
(where $M^{++}$ = Zn, Cu, Co, Ni, Mo, Hg)

Sodium hydrosulfide (NaSH or NaHS) is added in the sulfiding process. In the presence of residual acid (pH=4) remaining from the leaching process, NaHS will convert to hydrogen sulfide ($H_2S$) gas ($\uparrow$). The gas reacts with heavy metals to produce metal sulfides, which precipitate out of solution ($\downarrow$) for easy removal. In this process, there is a limit on how much and how quickly NaHS can be safely added to the solution. If an excess amount of NaHS is added, or is added at an accelerated rate, $H_2S$ will release from liquid prior to reacting (when pH<4.6), which will cause excessive gassing. As $H_2S$ is poisonous, corrosive, and flammable, it is desirable to avoid such an occurrence.

Following the sulfiding process, the $MnSO_4$ may be used to prepare EMD by any method known in the art.

Figure 2:
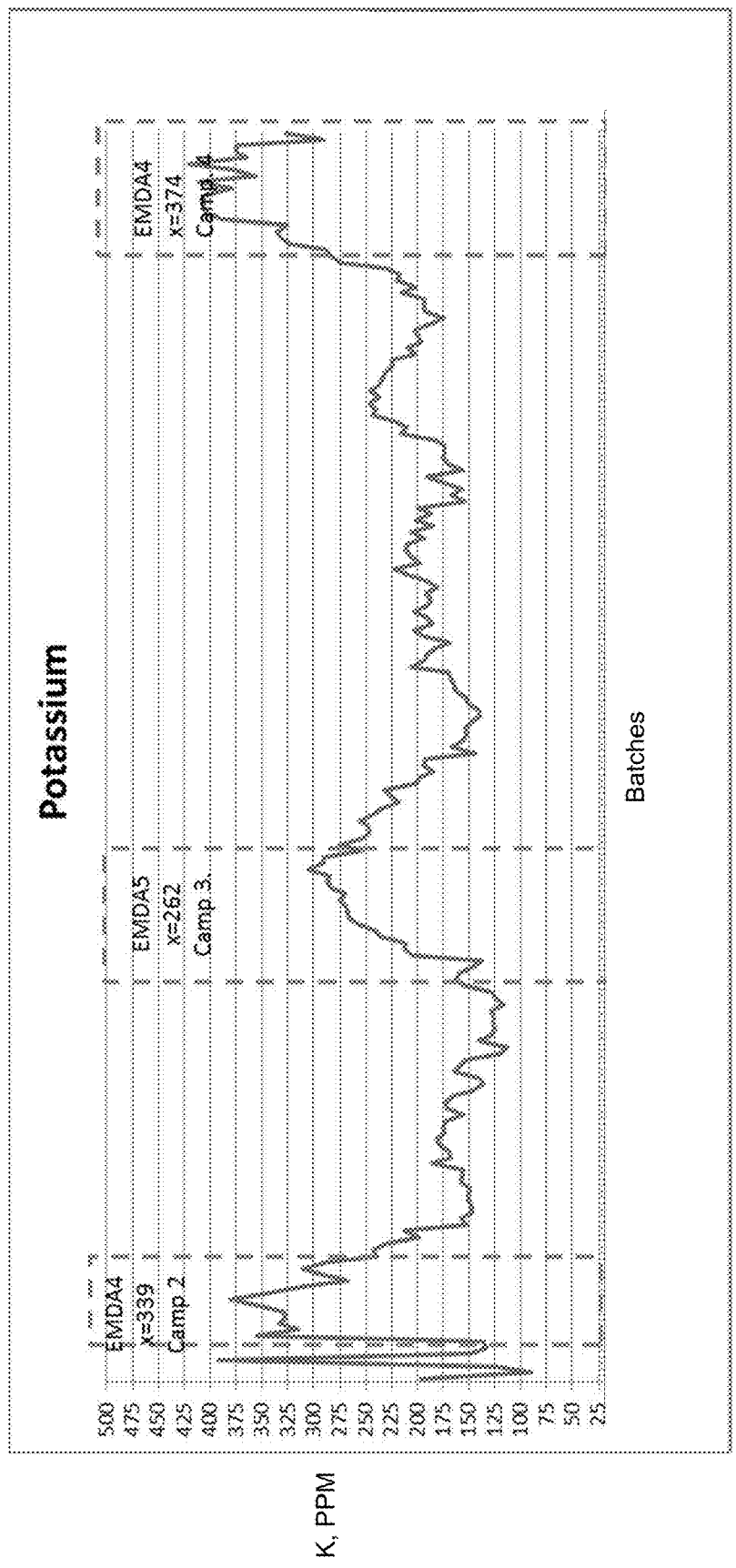
FIG. 2 shows potassium impurity levels in batches of recycled electrolytic manganese dioxide (EMD) (in dotted boxes) and non-recycled EMD (outside the dotted boxes). The X axis represents different batches of EMD.

In past efforts at preparing cathodes comprising 4% recycled manganese, the impurity level of potassium in cell feed averaged 20 PPM (FIG. 1), more than twice the standard amount in non-recycled material. In order to get the potassium impurity level down to 20 PPM, significant amounts of ferric sulfate were added in order to precipitate out the potassium. The final EMD product for the recycled material had potassium levels double (350 PPM) what is typically observed with non-recycled EMD production (175 PPM) (FIG. 2, showing potassium levels in EMD produced from recycled (in the dotted boxes) and non-recycled (outside the dotted boxes) manufacturing methods). For zinc, three times the normal amount of NaHS was required to remove this impurity.

Because higher recycled content manganese (i.e. >4% recycled) contains so much more zinc than non-recycled zinc, the sulfiding step requires more NaHS (more than six times as much, currently). While slowing down the NaHS feed rate can reduce the $H_2S$ release, these elevated concentrations create an increased opportunity for $H_2S$ gassing. By reducing the amount of zinc remaining in the recycled content post-leaching, the risk of gassing is reduced, as is the amount (and, thereby, cost) of added NaHS required for the process. Further, early assessment of producing a higher recycled content battery predicts that potassium levels would increase to over 500 PPM, an unsuitably high level.

The recycling process requires a significant amount of water, which will ultimately comprise impurities (such as zinc, potassium, and sodium compounds, including zinc oxide, zinc carbonate, potassium carbonate, and sodium carbonate) removed from the manganese. Each batch of approximately 2,500 lbs of material used 4,200 gallons of fresh water from start to finish. As mentioned above, a significant portion of this water is used in the washing step. Reusing this water is not ideal, as the resulting washed manganese could contain too high of a zinc concentration to be suitable for use as a battery. To avoid having to dispose of the water as waste, the zinc is removed. The pH of the water is raised by adding NaOH, preferably to a pH of at least about 9.0, more preferably to a pH of at least about 10.0, and even more preferably to a pH of at least about 10.1, and the zinc will drop out, as zinc carbonate ($ZnCO_3$) or zinc oxide (ZnO). The water, with the zinc removed, is then suitable for reuse.

EXAMPLES

Example 1—pH in Washing Step

Trials were conducted to hydrometallurgically clean recovered, mechanically separated material. In these trials, a sulfuric acid solution was used to wash the material. Both zinc and manganese will dissolve in low pH (high acid concentration) solutions. These evaluations looked at the acid concentration level (pH) on its effectiveness in removing potassium, zinc, and manganese. The goal was to achieve recipes that would remove potassium only and another to remove potassium and zinc while minimizing manganese dissolution. The ultimate goal is to dissolve the zinc and potassium while leaving the manganese behind as a solid. These methods were tested on six batches of recovered cathode material (Ore 338, Ore 339, Ore 340, Ore 341, Ore 342, and Ore 343) obtained from mechanically (M) separated batteries, and compared to the cathode material recovered from typically-washed hydrometallurgically (HM) separated batteries (Typical HM wash) and mechanically-separated, unwashed batteries (Typical M). 1,500 gallons of water was added to a wash tank, and 2,500 lbs of recycled material was sent through the hammer mill and added on top of the water, while the tank is mixing. Once added, the pH was adjusted with sulfuric acid and mixed for 30 minutes at room temperature, using a liquid to solid ratio of 13:1. The Typical HM wash material was mixed for 240 minutes at a temperature of 70° C., using a liquid to solid ratio of 5.6:1. The results are summarized in Table 3, below:

TABLE 3

Summary of results of washes at pH 1.5 and 4

|  | Typical | Typical | New process for M wash | | |
|---|---|---|---|---|---|
|  | Ore C4 | HM wash | Typical M | pH 4 | pH 1.5 | Target |
| Zn (PPM) | <100 | 29,000 | 70,000-100,000 | 70,000-100,000 | 4,200 | <15,000 |
| K (PPM) | 5000-7000 | 9,000 | 43,000 | 8,000 | 3,200 | <7,000 |
| Mn (%) | 48-50 | 46 | 46.5 | 51 | 51.5 | >48 |

Figure 3:
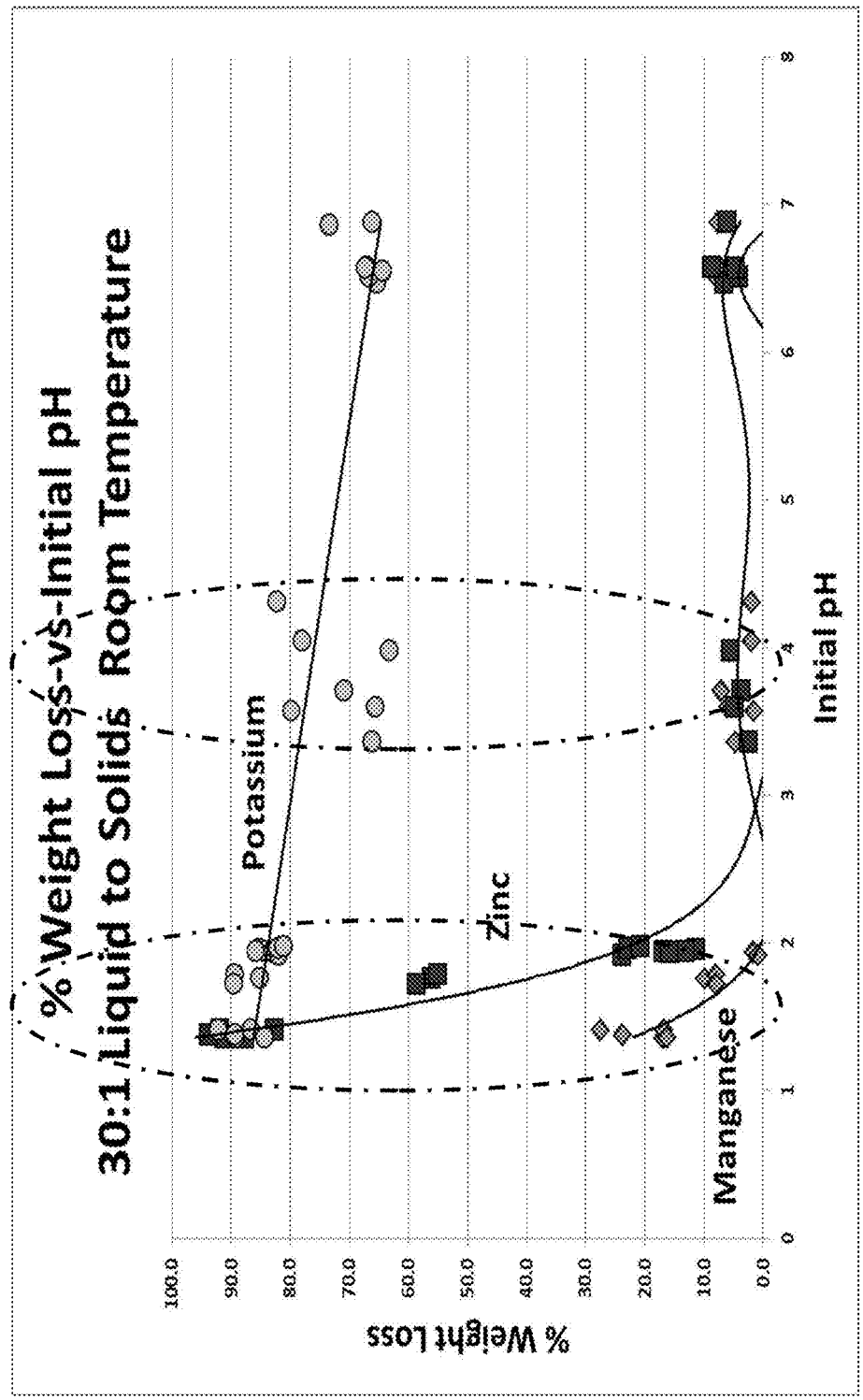
FIG. 3 shows weight loss results for washing recipes using a pH of about 4 and about 1.5.

Based on the factorial design experiments, it was found that a sulfuric acid solution with pH of 4 will be effective in removing only potassium. To remove zinc and potassium while minimizing the manganese losses, a pH of 1.5 was found ideal. At this pH level, up to 95% of the zinc and 92% of the potassium can effectively be removed, with relatively low dissolution of manganese. The remaining potassium is tied up in the manganese structure and can only be removed when the manganese is dissolved. Weight loss results, showing the utility of recipes having a pH of about 1.5 and a pH of about 4, may be seen in FIG. 3.

Since removal of both potassium and zinc was needed, the lower pH (1.5) was selected for further evaluations. As can be seen, the impact of this post washing (i.e. washing post-mechanical separation) on the mechanically separated material resulted in this material having lower potassium and higher manganese content as compared to regular non-recycled ore. The optimal cleaning conditions found to achieve this while minimizing added costs from washing (liquid and washing time) was to use a liquid to solid ratio of 13:1 with a minimum of a 30 minute wash at a pH of 1.5.

Figure 4:
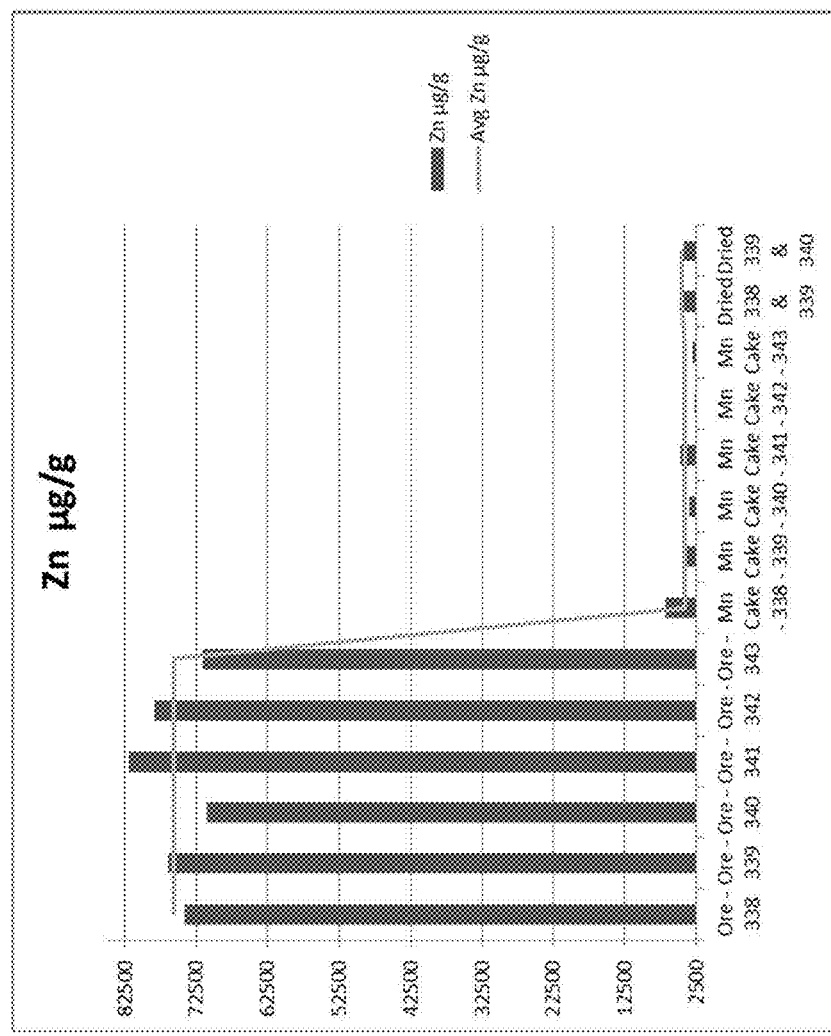
FIG. 4 shows zinc analysis for six batches of mechanically-separated recovered cathode material.

FIG. 4 shows the zinc analyses for the starting materials labeled Ore 338 to Ore 343. These are unwashed batches of mechanically-separated recovered cathode material used for each wash. Mn Cake-338 to Mn Cake-343 represent the analyses of zinc in the manganese product (reported as dry basis) in the wet product cake prior to drying. The Dried 338 & 339 (comprising all of batch 338 and half of batch 339) and Dried 339 & 340 (comprising all of batch 340 and half of batch 339) represent the final product. These are two final product batches where each dried product represents 1.5 wet cakes samples to produce the final product. As is evident in the figure, the zinc levels remained flat for each of the washed cakes and in the final product, confirming the process is stabilized. Both are approximately 4,000 PPM. This is significantly lower than the target of <15,000 PPM.

Figure 5:
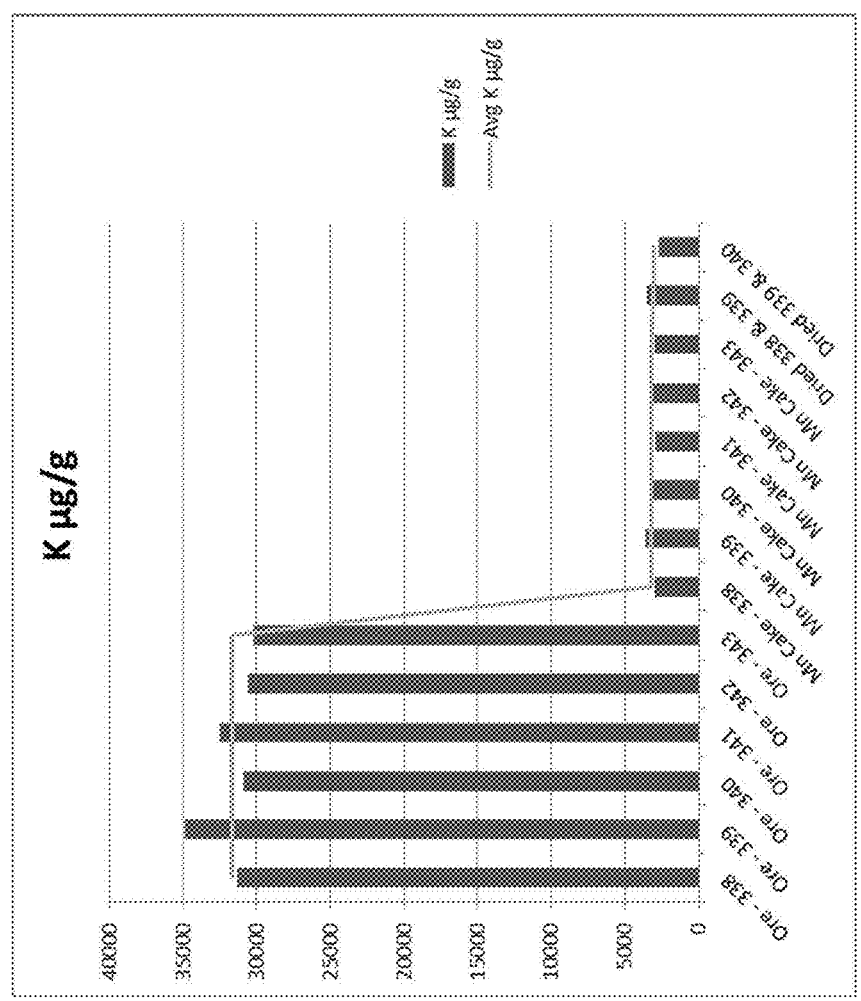
FIG. 5 shows potassium analysis for six batches of mechanically-separated recovered cathode material.

FIG. 5 shows the potassium analyses for the same materials as in FIG. 4. As is evident in the figure, the potassium levels also remained flat for each of the washed and in the final product confirming the process is stabilized. Both are approximately 3,000 PPM, which is well below even current virgin ore used, as well as the target of <7,000 PPM. As a result, the impact of potassium should be significantly improved for recycled and non-recycled batteries if this material is used.

Figure 6:
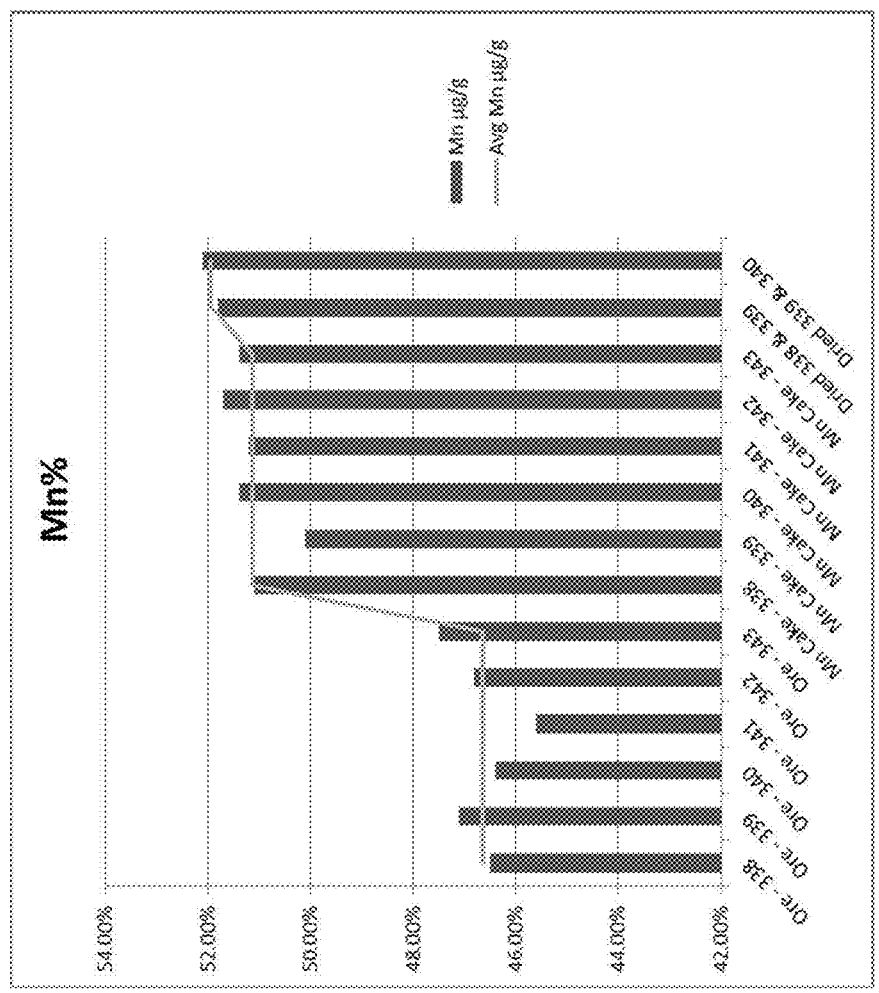
FIG. 6 shows manganese analysis for six batches of mechanically-separated recovered cathode material.

FIG. 6 shows the manganese analyses for the same materials as in FIG. 4. As is evident in the figure, the manganese levels also remained flat for each of the washed batches and in the final product confirming the process is stabilized. Both are approximately 51.5%, which is higher than currently used virgin ore, which has a 46 to 50% manganese content, and is also higher than the target of >48% manganese content. As a result, the manganese usage should be significantly improved for recycled and non-recycled batteries if this material is used.

Figure 7:
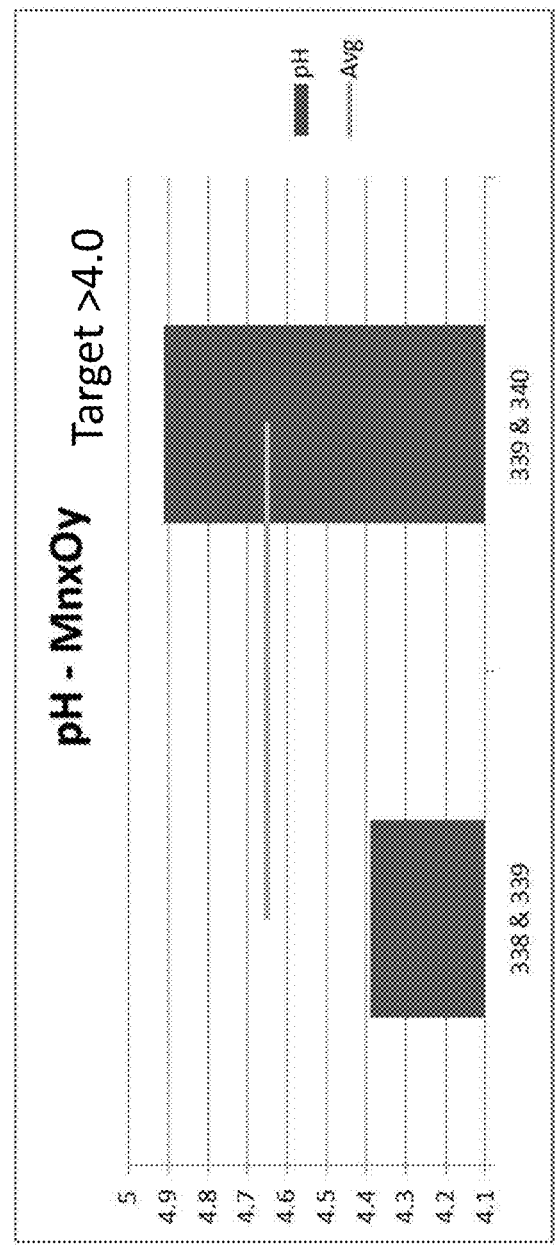
FIG. 7 shows the pH of washed and dried recovered manganese.

FIG. 7 is the pH of the two dried products (one with half of batch 339 and all of batch 338, and another with half of batch 339 and all of batch 340). Both had a pH greater than 4, which is beneficial for the calcining process. At these current higher levels, there is no risk of corrosion, and the material is not considered hazardous. Further production campaigns produced after this effort continue to have a pH above 4 (data not shown).

Example 2—Water Treatment and Re-use

As discussed above, the washing process uses a significant amount of water. Each batch (containing approximately 2,500 lbs of recycled cathode material) required 4,200 gallons of liquid, which would need to be treated as waste water and subsequently disposed of. Reusing the acid solution, without treatment, was attempted. In a first trial of reusing the water, both potassium and zinc were removed in an adequate amount. However, when the acid solution was re-used in another batch, the zinc level increased from 4,200 PPM to greater than 30,000 PPM. While better than unwashed material, this was unsuitable for efficient manufacturing processes.

A new hydrometallurgical process was designed to clean the manganese and then raise the pH of the liquid with sodium hydroxide (NaOH) to a pH of 10, which drops the zinc out of solution. The liquid, without the zinc, may then be re-used for the washing process, or returned to tanks for later re-use.

The first batch described above (Ore 338) was washed with fresh liquid, and then each of the five subsequent batches (Ore 339, Ore 340, Ore 341, Ore 342, and Ore 343) were washed with liquid which had been treated to remove zinc. The results showed that the treated liquid can be used at least 5 times. There is no indication that this is a limit for the total number of times that the liquid can be treated and re-used.

Figure 8:
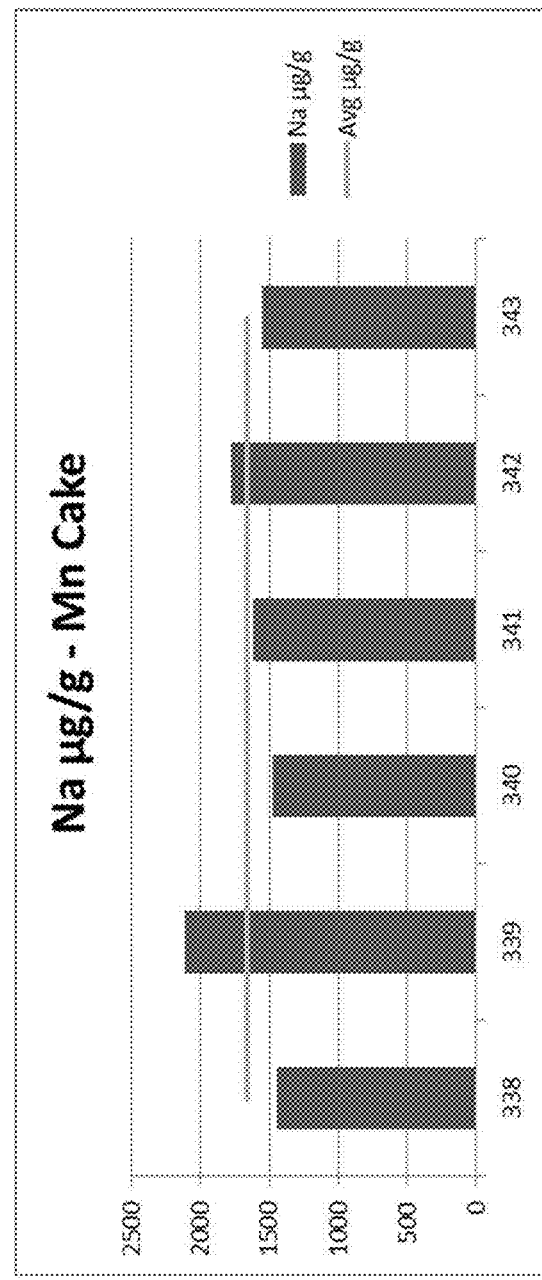
FIG. 8 shows a sodium analysis of one batch washed using fresh water and five batches washed using recycled water.

FIG. 8 shows the sodium (Na) analyses for the Mn Cake-338 to Mn Cake-343 (reported as dry basis) in the wet product cake prior to drying, and the average for all six batches. As is evident in the figure, the sodium levels also remained relatively flat for each of the washed products confirming the process is stabilized. This shows that, even though sodium is used to treat the water, there was no increase in sodium levels (i.e. buildup) over time.

The material washed with only fresh water (Ore 338) was compared to all of the washed samples. As the sodium concentration increased, it dropped out in the zinc product, leaving the sodium levels in the manganese product stable.

Figure 9:
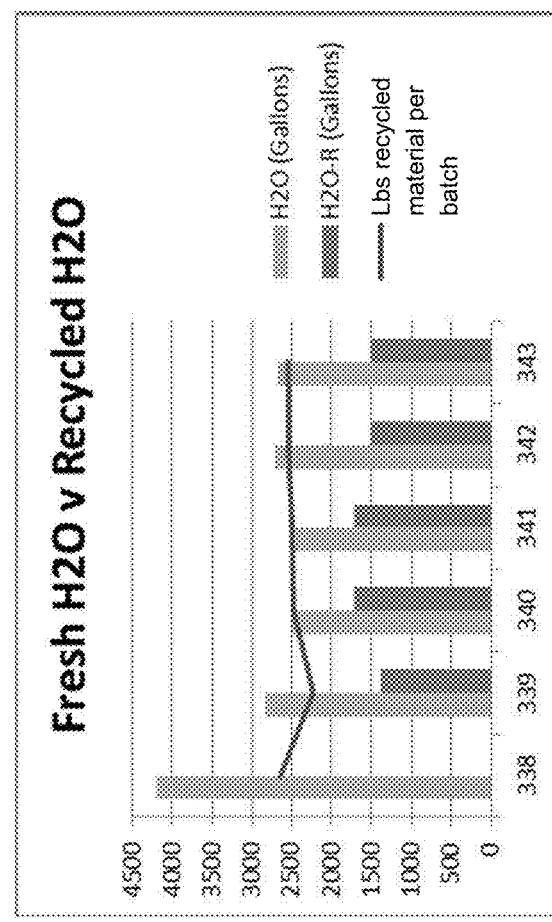
FIG. 9 shows the amount of fresh and recycled water used for the entirety of the recovery process in each of the six batches.

FIG. 9 is the amount of water used for each of the batches. Batch 338 used only fresh water ($H_2O$), while the subsequent batches each used 1,500 gallons of the treated water ($H_2O$—R) in the washing step. The remaining fresh water is used in the breaking, shredding and sieving of batteries in the process of obtaining the recycled material. In an embodiment, water obtained from the drying of the product is used in these processes. In another embodiment, more than 1,500 gallons of the water is treated and reused. In another embodiment, all of the water is treated and re-used.

Figure 10:
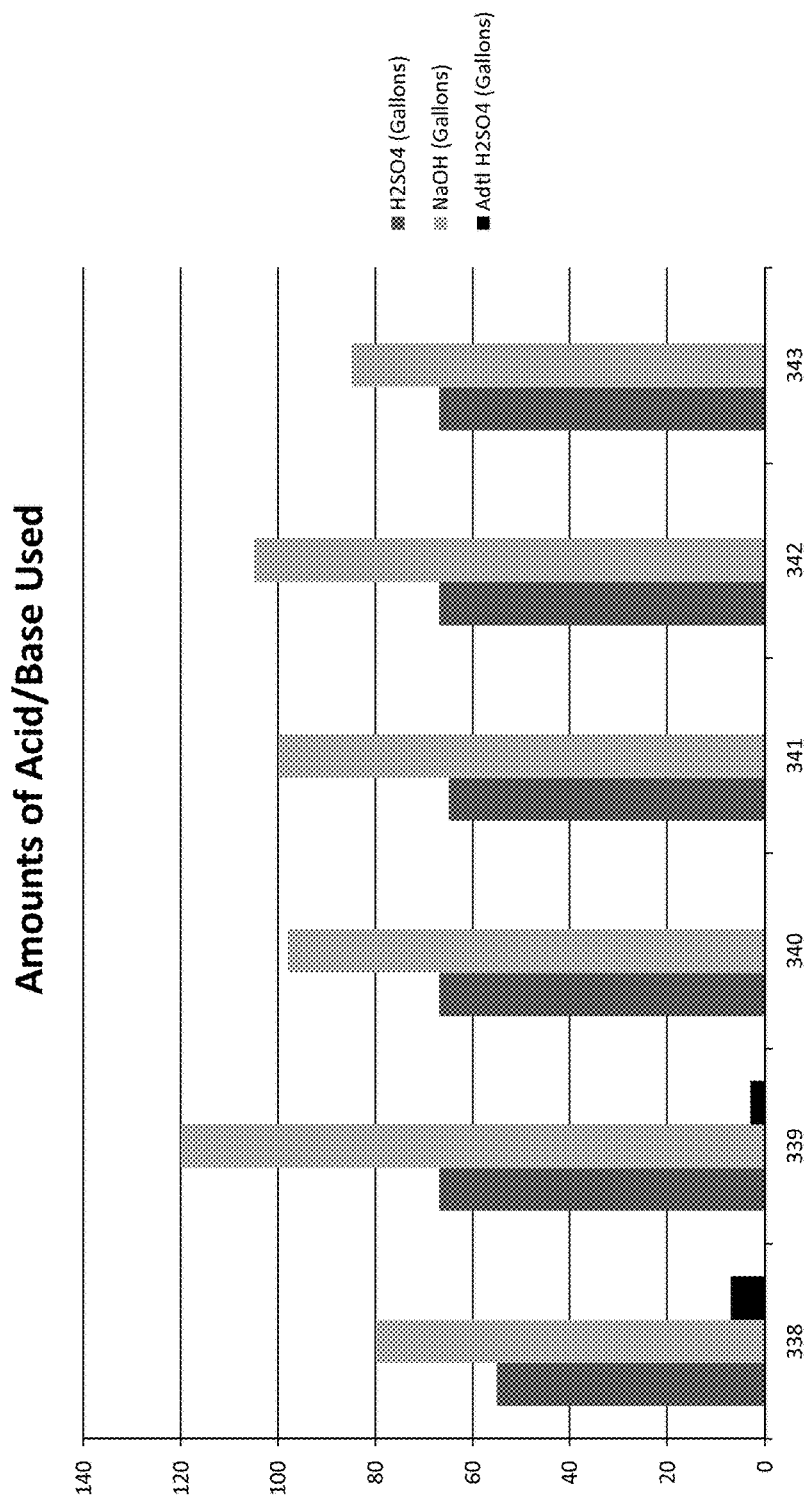
FIG. 10 shows the amount of sulfuric acid and sodium hydroxide used in the washing and water treatment for each of the six batches.

FIG. 10 shows the amount of sulfuric acid used to wash the manganese product (first bar in each column), the amount of NaOH used to treat the water to remove the zinc (second bar), and additional sulfuric acid used, if necessary, if the target pH was overshot in the treatment (third bar). Overall, the data shows that when using fresh water only, 55 gallons of 95% sulfuric acid is needed to wash the material at a pH of 1.5 and 80 gallons of 50% NaOH is needed to treat the water to remove the zinc at a pH=10. During the use of recycling of water, 67 gallons of acid and 100 gallons of caustic were needed. These recipes were confirmed during the full scale production of washing this material.

Example 3—Leach Optimization of Fe:K Ratio

As discussed above, potassium is also removed during the leaching step, following the washing step. Efforts to optimize potassium removal via the jarosite reaction were examined.

Leaching trials were conducted on 25% recycled material with various Fe:K ratios (11.5, 15, and 20) to determine what ratio minimizes the potassium in the final cell feed solution. To conduct this evaluation, the hydrometallurgically recycled material was selected as its impurities will be higher than the improved washed mechanically separated material. Therefore, the material represents the worst case scenario expected during production. To achieve the various levels of Fe:K, ferric sulfate was added.

Figure 11:
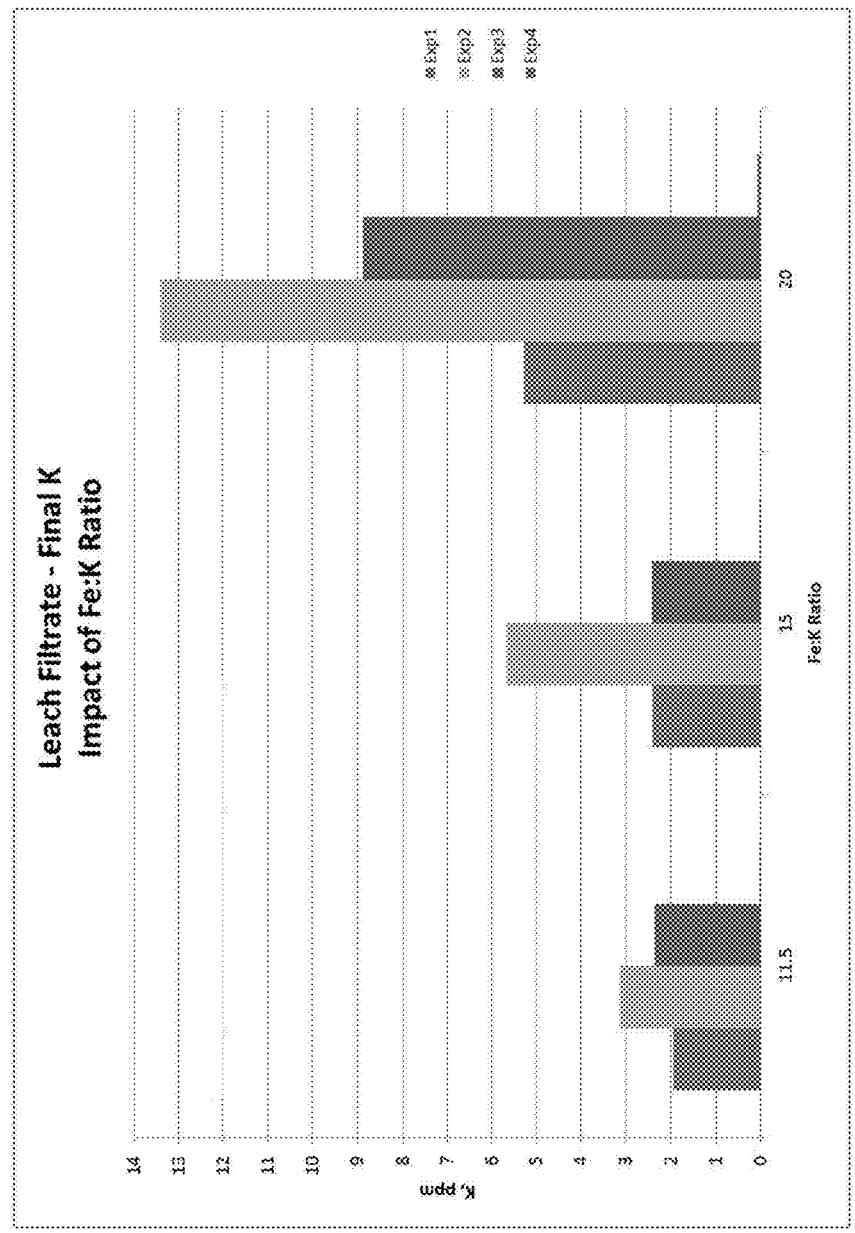
FIG. 11 shows the effect of Fe:K ratio on final leach potassium impurity levels for 25% recycled material.

The results, seen in FIG. 11, confirmed that the lowest overall potassium levels were achieved while using the 11.5 Fe:K ratio. Prior to this effort, previous work has shown that 11.5 is the minimum amount required to drive the jarosite reaction to remove potassium. This current work confirms that increasing the ratio above this will only increase the potassium level of the final solution. This is a result of the potassium that is included in the final ore addition to raise the pH. With higher Fe:K ratios, more ore is required to drive the pH above 3.8, the minimum level. More ore containing higher potassium levels only led to more potassium being dissolved into solution at the end of the leach process.

Example 4—Leach Optimization of Peroxide Step

Another variable that was considered was the impact of holding the leach longer during the $H_2O_2$ (peroxide) step to allow more potassium to be dissolved and react with the ferric. FIG. 12 summarizes the findings of increasing the time during the $H_2O_2$ step by 10, 20, and 30 minutes, using different Fe:K ratio. As expected, the longer times will aid in removing potassium regardless of the Fe:K ratio use.

However, as discussed, maintaining the Fe:K ratio at 11.5 is critical to avoid excess potassium needing to be added in the last ore addition. At this level, the added time does continue to improve removal of potassium; however, the current process is already within the range normally observed in non-recycled manganese production. Considering added time leads to more constraints for the remaining process and added costs, it is not recommended unless absolutely necessary to force potassium levels lower.

Example 5—Leaching

Figure 13:
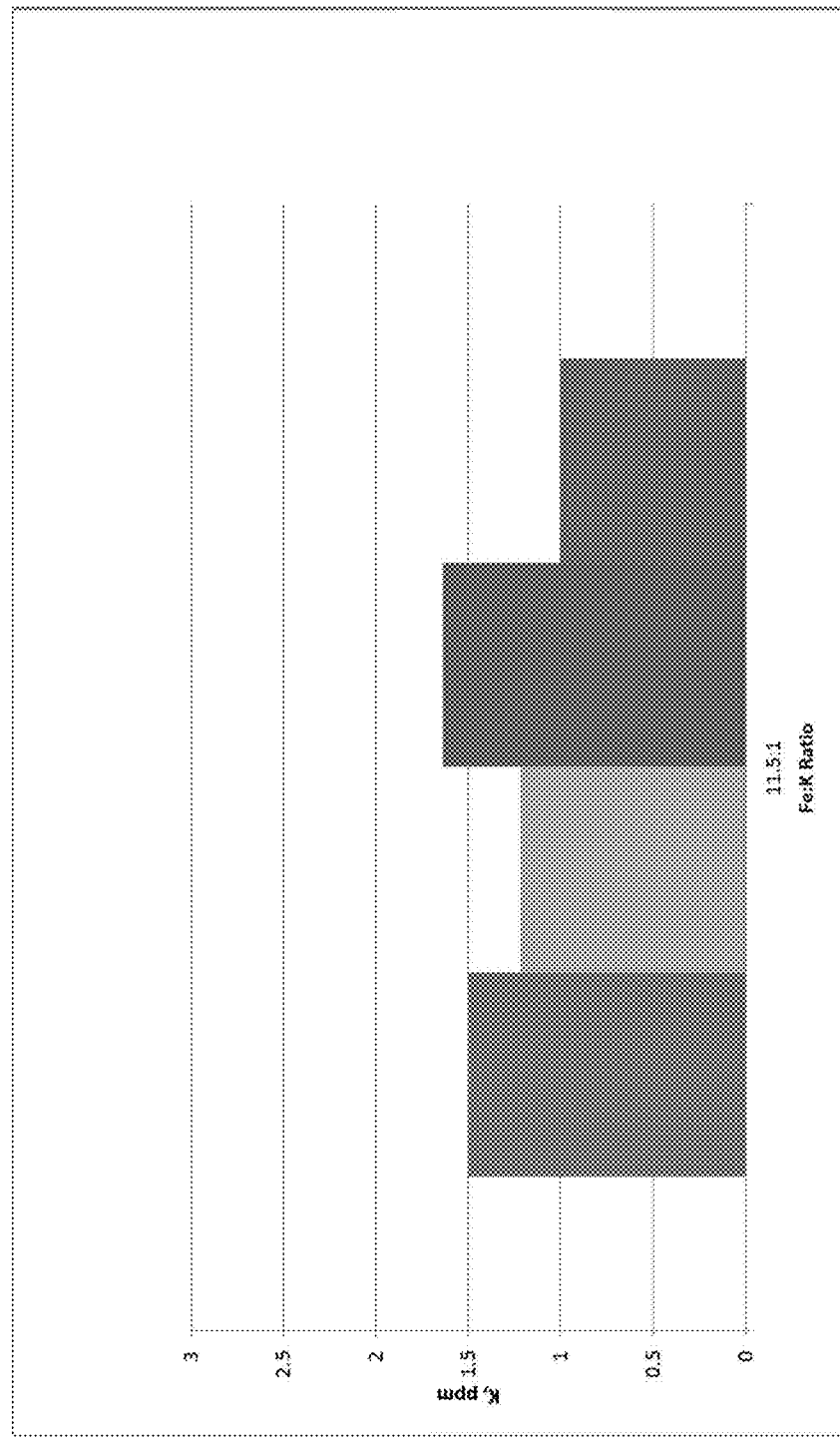
FIG. 13 shows the impact of using 25% recycled material on potassium impurity levels. The left three bars represent leaching of standard ore, while the rightmost bar represent leaching of 25% recycled ore.

Given the determinations made in the previous Examples, a small-scale capping run experiment was completed with 25% washed, mechanically-separated material. The results of this trial confirmed the current recipe with a potassium level of 1 PPM is achieved with this material (FIG. 13), which was lower than trials completing virgin ore. Moreover, as a result of the higher manganese content from washing the material, the amount of calcined ore (i.e. MnO) that must be added during the leach, in order to adjust the pH, is reduced. Table 4, below, compares the amount of ore added for the leaching of virgin (standard) ore compared to the leaching of the washed, 25% recycled material blend.

TABLE 4

Final recipe, standard ore vs. 25% washed and recycled material

| | Standard | | Washed 25% blend | |
| --- | --- | --- | --- | --- |
| Step | Ore Added (g) | pH Start-End | Ore Added (g) | pH Start-End |
| Initial | 24 | 0.572-1.401 | 24 | 0.572-1.443 |
| pH 1.6 | 5 | 1.401-1.660 | 4 | 1.443-1.701 |
| Jarosite | 3 | 1.981-2.072 | 2 | 1.989-2.051 |
| $H_2O_2$ | 4 | 2.675-3.311 | 4 | 2.715-3.210 |
| Final | 6.5 | 3.379-4.337 | 3 | 3.225-4.391 |
| Total | 42.5 | | 37 | |
| % of standard ore used | 100% | | 87% | |

The trial confirmed that 13% less ore was required when using the cleaner, higher manganese content recycled material. This should correlate to an increase in manganese efficiency and a decrease in the solids removed during the leach process as compared to virgin ore will be expected.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments.

LIST OF REFERENCES CITED

U.S. Pat. No. 8,728,419 to Smith et al., issued May 20, 2014
U.S. Pat. No. 8,911,696 to Smith et al., issued Dec. 16, 2014
U.S. Pat. No. 9,620,790 to Deighton, issued Apr. 11, 2017
Ferella F. et al., "Extraction of Zinc and Manganese from Alkaline and Zinc-Carbon Spent Batteries by Citric-Sulphuric Acid Solution," *Intl. J. Chem. Engineering*, Article ID 659434 (2010)
Sayilgan E. et al., "A review of technologies for the recovery of metals from spent alkaline and zinc-carbon batteries," *Hydrometallurgy*, 97:158-166 (2009)

What is claimed is:

1. A process for recycling batteries, comprising:
   a) separating active materials contained within battery cases from the battery cases, wherein the active materials comprise fine electrode powders of manganese oxides; and
   b) extracting residual zinc and potassium compounds from the fine electrode powders to obtain a purified manganese oxide product;
   wherein waste solution previously generated in the course of recycling batteries is used to extract the residual zinc and potassium compounds in part b);
   and wherein the waste solution has been treated to remove zinc by the addition of NaOH.

2. The process of claim 1, wherein part b) is performed in an aqueous solution or aqueous slurry at a pH of less than or about 1.5.

3. The process of claim 1, wherein part a) is carried out using a water spray to obtain a slurry of the fine electrode powders and pieces of the battery cases.

4. The process of claim 1, wherein the separation in part a) comprises sieving the active materials and the battery cases through a screen to separate the active materials from the battery cases.

5. The process of claim 1, wherein during part a) the active materials are present in the form of an aqueous slurry having a pH of greater than 8.

6. The process of claim 1, wherein the purified manganese oxide product from part b) is roasted at 350-400° C. to remove substantially all volatile or corrosive impurities or traces of mercury prior to calcinating the purified manganese oxide product at 850° C. or higher.

7. The process of claim 1, wherein part b) is performed using a liquid to solid ratio from about 12:1 to about 14:1.

8. The process of claim 2, wherein the aqueous solution or aqueous slurry comprises sulfuric acid.

* * * * *